United States Patent Office 3,700,610
Patented Oct. 24, 1972

3,700,610
COPOLYMERS OF VINYLPYRIDINES WITH 1,3,5-TRIACRYLOYLHEXAHYDRO-1,3,5-TRIAZINE
Jacobo Zelik Zabicky-Zissman, Rehovoth, Ida Oren, Hasharon, and Ephraim Katchalski, Rehovoth, Israel, assignors to Yeda Research and Development Co. Ltd., Rehovoth, Israel
No Drawing. Filed Aug. 21, 1970, Ser. No. 66,150
Claims priority, application Israel, Aug. 28, 1969, 32,912
Int. Cl. C08f 19/00
U.S. Cl. 260—2.1 E    9 Claims

ABSTRACT OF THE DISCLOSURE

Copolymers of vinylpyridines, which may be alkyl substituted, with 1,3,5-triacryloylhexahydro - 1,3,5 - triazine. These copolymers may be quaternized and utilized as ion exchangers. Alternatively, they are capable of complex formation with molecular halogen and may thus be utilized for the removal of elementary halogen from or its introduction into a desired medium.

---

The present invention consists in new copolymers of vinylpyridines, which may be alkyl substituted, with 1,3,5-triacryloylhexahydro-1,3,5-triazine.

1,3,5-triacryloylhexahydro - 1,3,5 - triazine has the following chemical structure:

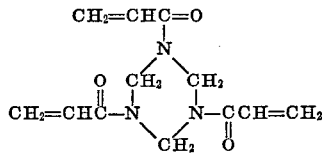

In the following this compound will be referred to for short as TAT.

The monomeric mixtures from which the novel copolymers are prepared may contain one or several different vinyl-pyridines. Representative members of the vinylpyridines that are applicable for the production of the novel copolymers according to the invention are 4-vinylpyridine, 2-vinylpyridine, 2-methyl-5-vinylpyridine.

Preferably, the monomeric mixtures from which the novel polymers are prepared contain from 2.5 to 15 percent by weight of TAT;

The new copolymers according to the invention are of the cross-linked type. The cross-linking occurs due to the fact that in the copolymerization of TAT with vinylpyridine only one acryloyl group of the former enters into one propagating polymeric chain while the remaining two acryloyl groups remain outside the propagating polymeric chain and are available for the cross-linking.

The novel copolymers according to the invention are weak bases and can be readily quaternized at their tertiary pyridyl nitrogen atoms, and in this form are useful as anion exchange resins. The quaternization occurs upon contact with a quaternizing agent and the so quaternized resin is capable of exchanging its anions. The invention thus also provides polymers as defined above in which at least part of the tertiary pyridyl amino groups are quaternized, as well as a method of anion exchange employing such quaternized copolymers.

Furthermore, the novel copolymers according to the invention in their non-quaternized, weak basic form, are capable of forming complexes with molecular halogen and it is believed that the sites of the complexation are again the pyridyl nitrogens, which are tertiary amino groups. The halogen complexes of the novel polymers according to the invention are useful in various fields. For example, such a complex may evolve a constant or slowly changing amount of pure free halogen to the surrounding gaseous or liquid medium, or take up some halogen therefrom, depending, among others, on the concentration of the free halogen in the surrounding medium and the halogen content of the complex. Use can be made of this property whenever buffering of a halogen level is required without contamination of the halogen by the buffering agent, e.g. for the purpose of disinfection of water-reservoirs, such as swimming-pools, industrial reservoirs or the like; or for maintaining a substantially constant halogen level in a liquid reaction medium in which halogen is formed in the course of the reaction, and the like.

The halogen complexes of the new copolymers according to the invention may also serve as halogen donors in various halogenation reactions. Quite generally, it has been established that the halogen complexes of the new copolymers according to the invention can be used for carrying out any reaction for which elementary halogen is required. This offers a great advantage since in this way problems arising from the poisonous and corrosive effects of elementary halogen can be avoided.

The halogen complexes of the novel copolymers according to the invention form readily upon contact of a copolymer with halogen. The formation occurs even when the concentration of the elementary halogen in the surrounding atmosphere or solution, aqueous or organic, is comparatively low. Consequently, the halogen complexes of the new copolymers may serve as scavengers for the recovery of halogen from liquid or gaseous media.

A halogen complex of a new copolymer according to the invention may be decomposed to produce elementary halogen or a halide solution. This decomposition can, for example, be effected by washing the complex with a suitable organic solvent, inorganic agent or by reductive treatment, e.g. with a sulfurous reducing agent, ammonia or an organic compound capable of undergoing halogenation.

The formation and decomposition of halogen complexes of the new copolymers according to the invention may be utilized in cyclic processes in which in a first stage elementary halogen is recovered from the reaction mixture in the form of a complex, and in a second stage the elementary halogen is liberated for consumption. The halogen evolved in this manner is free of foreign material since the carriers are cross-linked and insoluble. Halogen evolution is reversible, i.e. the polymer can be recharged in its activity regenerated. After several cycles substantially the same capacity of loading is retained. In this respect the novel copolymers according to the invention can be described as "halogen exchange resins." The complex formation can take place, for example, in the course of manufacture of the elementary halogen, or for the recovery of elementary halogen from waste solutions or gases, e.g. industrial flue or exhaust gases. The complexes may also be utilized for the storage and transportation of elementary halogen. This offers great advantages, for example, in the case of bromine which is known to be highly corrosive.

Quite generally, it may be said that the halogen complexes of the novel copolymers according to the invention are useful for a halogen transfer from one medium to another, i.e. for the storage and transportation of elementary halogen and subsequent release when and where required.

There are known copolymers of vinylpyridines with other monomers such as, for example, divinylbenzene and trivinylbenzene. The present new copolymers have advantages over the known ones, such as:

(1) For each TAT molecule incorporated in a polymeric chain, two acryloyl groups, i.e. two unsaturated side chains are left for cross-linking. Theoretically, the same degree of cross-linking is obtainable with trivinylbenzene, but monomeric trivinylbenzene is unstable and its use in a commercial scale is unpractical.

(2) The starting monomer TAT is a solid compound which is readily obtainable in a very pure form as contrasted to the commercially available divinylbenzene which is a mixture of hydrocarbons containing up to 45% of impurities or even more. These include, among others, substantial amounts of p-ethylstyrene which is incorporated as a monomer in the final copolymer without, however, having any cross-linking capacity. Thus, under the assumption that only 45% impurities accompany the divinylbenzene, 100 g. of this cross-linking co-monomer will be able to establish 0.423 mole of cross-links, while 100 g. of TAT will be able to establish 0.803 mole of cross-links.

(3) The mechanical strength of the polymer is a direct function of the amount of cross-links present. From the above it follows that for a given mechanical strength a lower proportion of the cross-linking co-monomer will be necessary in the case of TAT than in the case of divinylbenzene. This is of particular importance in cases where the pyridyl units of the polymer chain are needed for chemical reactions, such as formation of the halogen complexes or for quaternization in order to serve as anion exchanger. In such cases it is desired to increase the relative proportion of pyridyl units and decrease the relative proportions of unreactive moieties in the polymer.

(4) The novel copolymers according to the invention have an improved hydrophilicity over that of known vinylpyridine copolymers in which the cross-linking co-monomer is divinyl benzene or trivinylbenzene. This improved hydrophilicity is due to the hydrophilic carboxamide groups

The improved hydrophilicity is of great advantage for the application of the novel copolymers as anion exchangers or for the formation of halogen complexes in aqueous media.

For the purposes of preparing anion exchange resins, the nature of the vinylpyridine used may have an influence on the reactivity of the vinylpyridine-TAT copolymer towards the alkylating reagent, and after alkylation, the affinity of the resin for the various anions. This is the result of the different spacial environments of the nitrogen atoms in the various polyvinylpyridines.

Novel copolymers according to the invention are prepared by methods known in the art. Thus, for example, a bulk polymer is obtained upon leaving a properly initiated vinylpyridine-TAT mixture in a suitable vessel; or a pearl polymer is formed by dispersing the vinylpyridine-TAT mixture in a liquid medium and initiating the polymerization; or a pop corn polymer is formed by preparing a dispersion of a vinylpyridine-TAT mixture, adding to this dispersion an inert solvent such as, for example, petroleum ether or tetraline, initiating the polymerization and removing the solvent from the resulting particles. Many other conventional polymerization methods can be employed.

The polymerization may be carried out under an air atmosphere or in an inert gas atmosphere, e.g. nitrogen, and the polymerization temperature is preferably in the range from 35 to 70° C. Initiation of the polymerization is brought about by conventional agents, such as tert. butyl perbenzoate, azobisisobutyronitrile, a redox system of sodium hydrosulfite and potassium persulfate, benzoyl peroxide and the like.

Where it is desired to produce the copolymers according to the invention in pearl form, dissolution of the monomers in the dispersing phase should be avoided as far as possible. Thus, for example, 4-vinylpyridine yields at 20° C. a 2.91% solution in a water, so that upon copolymerization in an aqueous dispersion the dissolved monomers are solution-polymerized with a resulting reduction of the yield of the pearl polymer. In addition the solution-polymerization may cause coalescence of the pearls. On the other hand, it is necessary to use a low ratio of monomers to the dispersing phase, i.e. a high proportion of the dispersing phase, in order to obtain the desired pearls in good quality. Consequently, it may be desirable to take some measures in order to prevent or reduce the dissolution of the monomers in the dispersing phase. Thus, for example, where the dispersing phase is water the dissolution of the monomers is reduced by dissolving in the water an electrolyte, such as sodium chloride or sodium sulfate, which by a salting-out effect reduces the dissolution of the monomers. In addition it may be desirable to add some suspension stabilizer such as poly(vinyl alcohol), talc, magnesium oxide, calcium phosphate, floridin attapulgite, Triton (trade name for detergents supplied by the Rohm and Haas Company), magnesium carbonate, methyl cellulose, bentonite, diatomaceous earths, etc., and small amounts of other additives such as sodium nitrite or potassium persulfate.

The invention is illustrated by the following examples to which it is not limited. In the examples all indications of mesh size are according to U.S. Standard. Rates of conversion are calculated on the combined weight of vinylpyridine and TAT.

EXAMPLE 1

1.2 g. TAT and 13.8 g. 4-vinylpyridine were suspended by stirring in 150 ml. water containing 100 p.p.m. of poly(vinyl alcohol) under a nitrogen atmosphere. 215 mg. commercial benzoyl peroxide was added at 41–45° and the system was subjected to the following temperature regime: during 45 minutes the temperature was kept at 42 to 50° C., then during 60 minutes at 50 to 60° C., then for about two hours at 60 to 100° C. The conversion was 97% of polymer with the following particle distribution: 74% bigger than No. 16 mesh, 13.8% of size 16–30 mesh, 11.7% of size 30–80 mesh and 0.5% of size smaller than 80 mesh.

EXAMPLE 2

2.6 g. TAT, 19.1 g. 4-vinylpyridine, and 5.5 ml. petroleum ether (B.P. 100–120° C.) were added gradually and under stirring to 200 ml. water containing 500 p.p.m. of poly(vinyl alcohol) and 310 mg. commercial benzoyl peroxide under a nitrogen atmosphere. The stirred suspension was subjected to the following temperature regime: the temperature was kept for 165 minutes within the range of 58 to 68° C., then for 60 minutes within the range of 80–90° C. and finally for 165 minutes from 96 to 100° C. After washing away the petroleum ether and drying, 83% of porous pop corn polymer was recovered, with the following particle distribution: 13% of size 30–50 mesh, 16.6% of size 50–80 mesh, and 69.5% of size smaller than 80 mesh.

EXAMPLE 3

0.6 g. TAT and 9.4 g. 4-vinylpyridine were suspended by stirring in 100 ml. saturated sodium chloride solution containing 500 p.p.m. sodium nitrate, 400 p.p.m. of poly(vinyl alcohol), and 1100 p.p.m. of talc, and 136 g. of commercial benzoyl peroxide was added. The temperature was kept for one hour at 38–42° C., then gradually raised during 1 hour to 52° C., and finally maintained for 17 hours at 58–60° C. A conversion of 92.6% was attained and the particle distribution was as follows: 2.7% of size larger than 16 mesh, 2.2% of size 16–30 mesh, 74.5% of size 30–80 mesh and 20% of size smaller than 80 mesh.

EXAMPLE 4

Five identical runs were carried out as follows: 0.5 g. of TAT and 9.5 ml. of 4-vinylpyridine were suspended by stirring in 100 ml. of saturated sodium chloride solution at 39° C. and 71 mg. of commercial benzoyl peroxide was added. The yields obtained after various periods of reaction are summarized in Table 1 and are satisfactory after 3 hours.

TABLE 1

| Run No. | Reaction time (in hours) | Yield of polymer, percent |
| --- | --- | --- |
| 1 | 1 | 23.5 |
| 2 | 3 | 93 |
| 3 | 4 | 96 |
| 4 | 5 | 96 |
| 5 | 6 | 95 |

EXAMPLE 5

18 g. TAT, 282 g. 4-vinylpyridine and 3 g. commercial benzoyl peroxide were dispersed by stirring in 470 ml. of saturated sodium chloride solution containing 11.4 g. magnesium carbonate. After holding the suspension at 40° C. for 18 hours, 97% polymer was recovered having the following particle distribution: 1.3% of size larger than 10 mesh, 6.3% of size 10–16 mesh, 48.8% of size 16.30 mesh, 36.6% of size 30–50 mesh, 6.2% of size 50–80 mesh, and 0.8% of size smaller than 80 mesh.

EXAMPLE 6

0.6 g. TAT, 10 g. 2-vinylpyridine and 100 mg. commercial benzoyl peroxide were suspended by stirring in 100 ml. saturated solution of sodium chloride containing approximately 2000 p.p.m. of talc. After 4 hours 94% conversion into pearl polymer was attained.

EXAMPLE 7

Four identical runs were carried out as follows: 0.6 g. of TAT and 9.4 ml. of 2-vinylpyridine were suspended by stirring in 100 ml. of saturated sodium chloride solution at 60° C. and 100 mg. of commercial benzoyl peroxide were added. The yields obtained after various periods of reaction are summarized in the following Table 2 and are satisfactory after 3 hours.

TABLE 2

| Run No. | Reaction time (in hours) | Yield of polymer, percent |
| --- | --- | --- |
| 1 | 1 | 43.5 |
| 2 | 2 | 74 |
| 3 | 3 | 87 |
| 4 | 5 | 95 |

EXAMPLE 8

10.3 g. of TAT, 160 g. 2-vinylpyridine and 1.73 g. commercial benzoyl peroxide were dispersed by stirring 390 ml. of saturated sodium chloride solution containing 19.5 g. Celite trade name for a diatomaceous earth). After holding the suspension overnight at 60°, 94.5% polymer was recovered having the following particle distribution: 0.9% of size 10–16 mesh; 53% of size 16–30 mesh; 40.9% of size 30–50 mesh; 4.15% of size 50–80 mesh; 0.9% of size smaller than 80 mesh.

EXAMPLE 9

1.8 g. of TAT, 28 ml. of 2-methyl-5-vinylpyridine and 0.347 g. of azobisisobutyronitrile were suspended by stirring in 90 ml. of saturated sodium chloride solution at 40° C., containing 5 g. of magnesium carbonate. After 30 minutes the temperature was risen to 60° C. and kept for 2.5 hours, then it was lowered to 50° C. and kept for another 15 hours. The conversion was 82.2% of pearl polymer.

EXAMPLE 10

To a mixture of 1 g. of 2-vinylpyridine and 1 g. of 2-methyl-5-vinylpyridine, 0.1 g. of TAT was added at 65° C. The polymerization was initiated with 0.055 g. of azobisisobutyronitrile. After 45 minutes the mixture hardened, and was placed for curing overnight in a vacuum oven at 65–70° C. The bulk copolymer was a reddish transparent solid, obtained in a yield of 71% and had a nitrogen of 12.57%.

EXAMPLE 11

To a mixture of 1 g. of 2-vinylpyridine, 1 g. of 2-methyl-5-vinylpyridine and 2 g. of 4-vinylpyridine at 65°, 0.214 g. of TAT was added. The polymerization was initiated with 0.047 g. of benzoyl peroxide. After 30 minutes the mixture hardened and was placed for curing overnight in a vacuum oven at 65–70°. The bulk copolymer was a reddish transparent solid, obtained in 90° yield and had a nitrogen content of 12.85%.

EXAMPLE 12

To a mixture of 1 g. of 2-vinylpyridine, and 2 g. of 4-vinylpyridine 0.165 g. of TAT was added at 65°. The polymerization was initiated with 0.048 g. of benzoyl peroxide. The mixture hardened after a few minutes, and was placed overnight for curing in a vacuum oven, at 65–70°. The bulk copolymer was a reddish transparent solid, obtained in 90% yield, and had a nitrogen content of 13.0%.

EXAMPLE 13

To a mixture of 1 g. of 2-methyl-5-vinylpyridine and 1.5 g. of 4-vinylpyridine, at 62°, 0.137 g. of TAT was added. The polymerization was initiated with 0.026 g. of benzoyl peroxide. After 4½ hours the mixture became very viscous and was placed overnight for curing in a vacuum oven at 63–70°. The copolymer was a reddish transparent solid, obtained in 100% yield, and its nitrogen content was 12.4%.

EXAMPLE 14

To a mixture of 2.2 g. of 2-vinylpyridine, 4.8 g. of 2-methyl-5-vinylpyridine and 10 g. of 4-vinylpyridine, 0.903 of TAT was added at 65°. The comonomers mixture was suspended in 200 ml. of saturated sodium chloride solution at 65°, and the polymerization was initiated wtih 0.268 g. of benzoyl peroxide. After 21 hours at 65–72°, the pearl copolymer was filtered and washed with methanol, water and acetone, and dried in vacuum at 65°. The pearl copolymer was light brown, obtained in a yield of 98%, and its nitrogen content was 12.8%.

EXAMPLE 15

1.834 g. of copolymer of 4-vinylpyridine and TAT (12.41% N) was placed together with 12 ml. of ethyl bromide in 20 ml. of nitromethane, at room temperature, for 48 hours. The quaternized resin was filtered, washed with petroleum ether and vacuum dried at 50° C. The extent of quaternization was 90%.

EXAMPLE 16

0.374 g. of a copolymer of 4-vinylpyridine and TAT (12.41% N) was placed together with 3 ml. of methyl iodide in a sealed ampoule, at 50° for 20 hours and then at 108° for 5 hours. The quaternized resin was filtered, washed with ethanol and vacuum dried. The extent of quaternization was 70%.

EXAMPLE 17

2.5915 g. of a copolymer of 4-vinylpyridine and TAT (13.0% N) was placed together with 9.3664 g. of benzyl chloride in 10 ml. of nitromethane, and kept at 54°±2° for 24 hours. The progress of the quaternization was as follows: after 0.5 hour, 44%; after 3 hours, 47%; after 24 hours, 53.5%.

EXAMPLE 18

2.2915 g. of a copolymer of 2-vinylpyridine and TAT (13(24% N) was placed together with 8.282 g. of benzyl chloride in 10 ml. of nitromethane, at 54±2° for 24 hours. The progress of the quaternization was as follows: after 0.5 hour, 2%; after 3 hours, 4%; after 24 hours, 10%. The lower yields of quaternization of the copolymer of 2-vinylpyridine as compared to those of the copolymer of 4-vinylpyridine are very marked, and stem probably from the enhanced steric hindrance towards the attack of a bulky benzyl group in the former copolymer.

EXAMPLE 19

2.07 g. of a copolymer of 4-vinylpyridines and 5% by weight of TAT, of size 14–16 mesh, was treated with 6 g. of 2,3-dibromopropanol dissolved in about 30 ml. of carbon tetrachloride, at 20–25° C. After 20 hours a sample was retrieved from the mixture, washed with carbon tetrachloride, vacuum-dried at 60° C., and analysed. After an additional 45 hours of reaction, the quaternized polymer was filtered, washed with carbon tetrachloride, and vacuum-dried at 60° C. The total weight of quaternized polymer was 5.03 g. The results of the analyses are indicated in Table 3 below. They show that about 0.75 mole of 2,3-dibromopropanol per gram-atom of nitrogen present in the polymer reacted to yield quaternized pyridine moieties. The reasons for a lower than 1:1 stoichiometry are:

(a) Part of the 2,3-dibromopropanol may quaternize two pyridyl moieties;

(b) Part of the 2,3-dibromopropanol may undergo HBr elimination with the HBr remaining attached to the polymer;

(c) About 6% of the nitrogen in the polymer are located in the TAT moieties and do not undergo quaternization.

TABLE 3*

| Sample | Percent | | | |
|---|---|---|---|---|
| | C | H | N | Br |
| Fresh polymer | 74.98±0.15 | 6.94±0.02 | 13.02±0.05 | 0 |
| After 20 hrs | 38.96±0.14 | 4.18±0.02 | 4.71±0.04 | 42.26±0.01 |
| After 65 hrs | 40.16±0.11 | 4.21±0.03 | 4.91±0.11 | 45.04±0.13 |

*All elementary analyses were carried out in duplicate.

EXAMPLE 20

0.640 g. of a copolymer of 4-vinylpyridine and TAT, quaternized with benzyl chloride (see Example 17 after 24 hr.) and having a chloride content of 3.05 meq./g. was placed in 10 ml. of 2 N sodium hydroxide, at 60° C. After 2 hr. the solution contained 90% of the chloride originally present in the resin.

EXAMPLE 21

0.1125 g. of a copolymer of 4-vinylpyridine and TAT, quaternized with ethyl bromide (see Example 15) and having a bromide content of 4.28 meq./g., was placed in a mixture of 50 ml. concentrated nitric acid (396 g./l.) and 10 ml. sodium nitrate solution (60 g./l.). After 1.5 hr. the solution contained 99% of the bromide ions originally present in the resin.

EXAMPLE 22

0.0545 g. of a copolymer of 4-vinylpyridine and TAT, quaternized with methyl iodide (see Example 16) and having an iodide content of 2.62 meq./g., was placed in a mixture of 35 ml. concentrated nitric acid (396 g./l. and 2 ml. sodium nitrate solution (60 g./l.) After 1.5 and 72 hrs., the solution contained respectively 60% and 62% of the iodide ion originally present in the resin.

EXAMPLE 23

0.1829 g. of the quaternized resin obtained in Example 19, were swollen with a 4:1 water-ethanol mixture. The swollen quaternized resin was placed in 20 ml. of 1 N nitric acid for 20 minutes, after which 27 mg. of bromide ion was present in the solution, that is, 33% of the total bromine present in the resin was exchanged by nitrate anions.

EXAMPLE 24

257.95 mg. of a copolymer of 4-vinylpyridine and 8% by weight of TAT with particle size of 16–30 mesh was left overnight in 80 ml. of 1.51% bromine-water. The polymer-bromine complex had a free bromine content of 60.95±0.7%, while the total bromine content was 61.65±0.2%. In this context the term "free bromine" means bromine which can be extracted from the polymer-bromine complex and is capable of oxidizing alkali iodides to elementary iodine, which latter is titrated with sodium thiosulfate solution, while the term "total bromine" includes all types of chemical binding of the bromine atoms in the polymer-bromine complex. 253.15 mg. of dry Dowex 21 K (trade name for a synthetic resin supplied by the Dow Chemical Corporation) in the chloride form with particle size 16–20 mesh and exchange capacity of 4.5±0.3 meq./g. of dry resin, was left overnight in 80 ml. of 1.51% bromine-water. The free bromine content of the recovered complex was 53.3±1.55%, while the total bromine was 67.15±0.8%.

EXAMPLE 25

195.22 mg. of a copolymer of 2-vinylpyridine and TAT, with particle size 16–30 mesh was left overnight in 80 ml. of a 1.80% bromine-water solution. The polymer-bromine complex contained 60.25 ±0.07% free bromine and 64.25±0.35% total bromine (for definition see Example 24). 201.73 mg. of the same polymer with particle size 30–50 mesh, when treated in identical manner, yielded a polymer-bromine complex with 60.30±0.57% of free bromine and 62.74±0.65% of total bromine.

EXAMPLE 26

14.915 g. of pears (30–50 mesh) of a copolymer of 4-vinylpyridine and TAT was placed in 733 ml. carbon tetrachloride containing 0.793 mole of bromine chloride (BrCl). After 20 hr. the complex contained 3.58 meq. of oxidant per g. of complex. Elementary analysis showed a total bromine content of 1.94 meq./g. and a total chlorine content of 1.95 meq./g. This represents a yield of about 26% of complex formation.

15.000 g. of a powdered, highly porous copolymer of 4-vinylpyridine and TAT, yielded after about 3 hr., with the same solution, a complex containing 8.83 meq. of oxidant per g. of complex, while the total bromine and total chlorine were respectively 4.09 and 5.67 meq./g. This represents nearly quantitative yield of complex formation.

The slight excess of total halogen over oxidant is probably due to a partial attack of halogen on the polymeric matrix, yielding both organically bound halogens and hydrogen halides.

EXAMPLE 27

1.074 g. of a powdered, highly porous copolymer of 4-vinylpyridine and TAT was placed for two days in 217 ml. of carbon tetrachloride containing 0.0529 mole of iodine bromide (IBr). The oxidant found was 6.5 meq./g., while the individual total iodine and total bromide found were 3.15 and 3.16 meq./g., respectively. This represents a 98% yield of complex formation.

EXAMPLE 28

2.557 g. of a powdered, highly porous copolymer of 4-vinylpyridine and TAT was placed in 254 ml. of carbon tetrachloride containing 0.03515 mole of iodine chloride (ICl). After 18 hr. the complex contained 6.4 meq. of oxidant per g. of complex. The total iodine and total chlorine found were 3.02 and 3.16 meq./g., respectively. This represents 65% yield of complex formation.

EXAMPLE 29

1.144 g. of a copolymer of 4-vinylpyridine and TAT was placed in 200 ml. of carbon tetrachloride containing 0.097 mole of chlorine ($Cl_2$). After 3 days of stirring at room temperature the resin contained 0.62 meq./g. of oxidant. The total chlorine content was 3.05 meq./g. These results show extensive degradation of the polymer by chlorine and poor charge transfer complex formation. The mixed halogens containing chlorine (BrCl and ICl), on the other hand did not attack the resin and have high yields of complex.

EXAMPLE 30

0.889 g. of a porous, powdered copolymer of 2-methyl-5-vinylpyridine and TAT was placed in 200 ml. of carbon tetrachloride containing 0.026 mole of iodine ($I_2$). After 1 day the complex contained 4.24 meq./g. of oxidant. The total iodine content was 5.07 meq./g. This represents 56% yield of complex formation.

EXAMPLE 31

26.1 g. of bromine-loaded copolymer of 4-vinylpyridine and TAT, containing 55.1% of free bromine, was placed in 150 ml. of an aqueous solution containing 223 g./l. of sodium bromide. The mixture was heated under stirring at 50–60° C. for 1 hour and a stream of air was passed into it for an additional 1.5 hours. By these means 4.95 g. of free bromine was liberated from the loaded resin, that is, 34.4% of the original free bromine content of the resin.

EXAMPLE 32

A sample of a copolymer of 4-vinylpyridine and 5% by weight of TAT was subjected to a series of cycles consisting of loading the resin with free bromine by means of an aqueous bromine solution, followed by the reduction of the free bromine attached to the resin with 25% aqueous ammonia. The analyses of resin samples, taken at various stages of this loading-reducing process, are summarized in Table 4, and show that the reduction of the bromine attached to the resin does not impair the bromine-loading capacity of the resin.

TABLE 4

| Cycle No. | Bromine-loaded resin | | Ammonia-reduced resin | |
|---|---|---|---|---|
| | $Br_2$ percent | N percent | $Br_2$ percent | N percent |
| 1 | 46.1 | | | 13.0 |
| 2 | 68.7 | 4.2 | 8.1 | 7.8 |
| 3 | 70.0 | | 9.9 | 9.9 |

We claim:

1. A copolymer of 1,3,5-triacryloylhexahydro-1,3,5-triazine alone with a pyridine selected from the class consisting of vinylpyridines and alkyl substituted vinylpyridines, the 1,3,5-triacryloylhexahydro-1,3,5-triazine constituting from 2.5 to 15% by weight of the copolymer.

2. A copolymer according to claim 1, in which at least part of the tertiary amino groups are quaternized.

3. A copolymer of 2-vinylpyridine with 1,3,5-triacryloylhexahydro-1,3,5-triazine, the 1,3,5-triacryloylhexahydro-1,3,5-triazine constituting from 2.5 to 15% by weight of the copolymer.

4. A copolymer of 4-vinylpyridine with 1,3,5-triacryloylhexahydro-1,3,5-triazine, the 1,3,5-triacryloylhexahydro-1,3,5-triazine constituting from 2.5 to 15% by weight of the copolymer.

5. A copolymer of 2-methyl-5-vinylpyridine with 1,3,5-triacryloylhexahydro-1,3,5-triazine, the 1,3,5-triacryloylhexahydro-1,3,5-triazine constituting from 2.5 to 15% by weight of the copolymer.

6. A copolymer of a mixture of 2-vinylpyridine and 4-vinylpyridine with 1,3,5-triacryloylhexahydro-1,3,5-triazine, the 1,3,5-triacryloylhexahydro-1,3,5-triazine constituting from 2.5 to 15% by weight of the copolymer.

7. A copolymer of a mixture of 2-vinylpyridine and 2-methyl-5-vinylpyridine with 1,3,5-triacryloylhexahydro-1,3,5-triazine, the 1,3,5-triacryloylhexahydro-1,3,5-triazine constituting from 2.5 to 15% by weight of the copolymer.

8. A copolymer of a mixture of 4-vinylpyridine and 2-methyl-5-vinylpyridine with 1,3,5-triacryloylhexahydro-1,3,5-triazine, the 1,3,5-triacryloylhexanhydro-1,3,5-triazine constituting from 2.5 to 15% by weight of the copolymer.

9. A copolymer of a mixture of 2-vinylpyridine, 4-vinylpyridine, 4-vinylpyridine and 2-methyl-5-vinylpyridine with 1,3,5-triacryloylhexahydro-1,3,5-triazine, the 1,3,5-triacryloylhexahydro-1,3,5-triazine constituting from 2.5 to 15% by weight of the copolymer.

References Cited

UNITED STATES PATENTS

| 2,732,351 | 1/1956 | Clarke | 260—2.1 |
| 2,768,991 | 10/1956 | Schnell et al. | 260—2.2 |
| 3,565,872 | 2/1971 | Katchalski et al. | 260—80.22 |

FOREIGN PATENTS

| 1,428,033 | 1/1966 | France. |
| 17,803 | 11/1959 | Germany. |

OTHER REFERENCES

Helfferich: Ion Exchange, McGraw-Hill, New York, 1962 (pp. 129–30).
Galitskaya et al.: Plast. Massy, 1967(7), 13–16.
Pashkov et al.: Plast. Massy, 1966(9), 3–5.

MELVIN GOLDSTEIN, Primary Examiner

U.S. Cl. X.R.

23—216, 217; 260—80.3 R